United States Patent Office 3,525,689
Patented Aug. 25, 1970

3,525,689
ORGANIC LIQUIDS THICKENED WITH SILICA-SILICATE MATERIALS
Ralph Marotta, St. Louis, Mo., assignor to Monsanto Company, St. Louis, Mo., a corporation of Delaware
No Drawing. Filed Feb. 1, 1968, Ser. No. 702,213
Int. Cl. C10m 5/12, 5/02, 7/02
U.S. Cl. 252—13                                    16 Claims

ABSTRACT OF THE DISCLOSURE

The present invention provides a novel thickening agent which comprises an intimate mixture of (a) silica aerogel or fume silica, or mixtures thereof and (b) chrysotile asbestos, said asbestos being present in an amount of at least 25% by weight based on the total weight of said mixture. The present invention also relates to various organic liquid compositions (e.g. styrene-polyester resin liquids) containing such mixture therein as a thickening agent therefor.

---

The present invention generally relates to novel thickening agents and to liquids thickened with such novel thickening agents. More particularly, the present invention relates to a mixture of asbestos and certain silica materials, hereinafter defined, and to organic liquid compositions or formulations containing, for example, plastic or resinous substances and thickened with small amounts of such mixture.

The desirability of thickening organic liquids for use in certain applications has been recognized in the prior art and it has been proposed heretofore to thicken a variety of such liquids by incorporating therein inert inorganic materials including mica, diatomaceous earth, talc, alumina, graphite, and the like, and in particular, silica aerogels. For example, it has been proposed, in U.S. Pat. 2,260,625, issued to Samuel S. Kistler, to thicken oily liquids, such as lubricating oils, and to convert such oils into greases by incorporating silica aerogels in amounts up to as high as 50% in such oils. Silica aerogels described in U.S. Pat. 2,285,449, issued June 9, 1942, to Morris D. Marshall and U.S. Pat. 2,285,477, issued June 9, 1942, to John F. White have also been used to thicken oils. Also, for example, it has been proposed in U.S. Pat. 2,892,730, issued to Harry Kloepfer and Otto Schweitzer, to thicken organic liquids containing high molecular weight film formers, such as nitrocellulose, cellulose acetate, polyvinyl acetate, chlorinated rubber and the like dissolved in organic solvents, with oxides of silicon, aluminum and titanium, to prevent the settling of mineral fillers therefrom.

It has also been proposed in U.S. Pat. 2,610,960, issued to Birger W. Nordlander, to thicken, and/or render thixotropic coating and filling compositions such as polymerizable organic liquids consisting of liquid polyester resins by the incorporation of vermiculite in an amount as high as 50% by weight of the vermiculite in such liquids. It has also been proposed in U.S. Pat. 2,887,461, issued to Eugene V. Horst, to render thixotropic, laminating compositions consisting of solid polyester resins dissolved in styrene by the incorporation of silica aerogels, such as the silica aerogel described in the aforesaid Kistler, Marshall, or White patents or mixtures of such silica aerogel and alumina in amounts as high as 20% by weight of such inorganic materials in the liquids. By thickening and/or rendering such liquids thixotropic, it has been possible to substantially overcome the problem of drainage of such compositions away from the coated or filled objects to which the composition has been applied.

In U.S. Pat. 3,210,273, issued to Thomas A. Taulli, it has also been proposed to thicken organic liquid compositions by the incorporation therein of amorphous organo-silica aerogels having certain physical and chemical characteristics different from the aforementioned Marshall and White aerogels.

However, the above-described thickening agents possess certain disadvantages, in that (except for the aerogels of the Taulli patent) relatively large amounts of such materials are required to significantly thicken or increase the viscosity of organic liquids and/or render these liquids capable of forming thixotropic gels. Thus, for example, the thickening agents when used in large quantities, in some instances, adversely affect the properties of such organic liquids or the use thereof, while in other instances, the cost of these thickening agents renders their use, in the large quantities normally required, economically prohibitive. Although silica aerogels of the type described in the aforementioned Marshall or White patents have been used as thickening agents for oils, the commercial utility of these materials for thickening polymerizable organic liquids, such as plastisols, polyesters and epoxide resins, prior to the curing of these materials is not of general applicability under all conditions of mixing and concentrations of silica desired. In using liquid resins (particularly the polymerizable resins, for example, polyesters or solutions thereof) the liquids are applied as filling and coating compositions or films as desired, following which the curing of the resin is caused to take place. One of the problems encountered in applying liquid resins, for example, in the fabrication of laminates such as fiber glass, is the tendency of the liquid to flow or drain away from the surface to which it is applied when such surface is not disposed in the horizontal plane, as is frequently the case. Thus, it has been necessary to incorporate relatively large amounts, e.g., usually in excess of 10% by weight, of the silica aerogels of Marshall and White in such polymerizable liquids to obtain adequate thickening and prevent drainage, although it is known that amounts in excess of 5% or 6% by weight of a silica aerogel in such liquids usually adversely affect the properties of the polymers when cured. Generally stated, the silica aerogels per se of the type described in the aforementioned Marshall or White patents are relatively inefficient at lower concentrations, i.e., <10%, and uneconomical at higher concentrations, i.e., >10%, for use as thickening agents for organic liquids.

The disadvantage associated with the aerogels of the Taulli patent, U.S. 3,210,273, is that while organic liquids can be thickened by incorporating therein the Taulli aerogels per se, the viscosities of the thickened liquids are not as high as may be desired in certain instances and in certain organic liquids, particularly at low silica weight levels (for example, 2% by weight or less). Consequently, there is a need for thickening agents which impart thixotropy to mobile organic liquids or fluids and which are even more efficient as thickeners on a weight basis than those disclosed in the Taulli patent U.S. 3,210,273.

In accordance with the present invention, it is possible to thicken organic liquids by incorporating in such liquids certain hereinafter defined thickening agents which are improved and more efficient as thickeners for a variety of organic liquids than those silica aerogels heretofore known in the prior art.

Accordingly, it is one object of the present invention to provide novel thickening agents, particularly containing small quantities of silica materials.

It is a further object to provide organic liquids thickened with the novel thickening agents.

It is another object of this invention to provide compositions comprising organic liquid oily or lubricating substances thickened with relatively small amounts of the novel thickening agents.

It is also an object of this invention to thicken organic liquids economically and/or without appreciably altering the useful properties of such liquids or the end products made therefrom.

It is a more particular object of the present invention to provide compositions comprising liquid plastisols or resins thickened and/or made thixotropic by the incorporation therein of relatively small amounts of the novel thickening agents and which are useful in a wide variety of commercial applications.

These and other objects and advantages of the present invention will be or become apparent from the following description and the appended claims.

It has unexpectedly been found that a mixture of certain silica material and chrysotile asbestos substantially increases the viscosity of a wide variety of organic liquids when said agent is incorporated therein. One of the unique facets of the present invention is that the silica material can be effectively utilized in amounts substantially less than 10% by weight (based on the weight of the organic liquid to be thickened) when combined with the chrysotile asbestos. Also it has been shown by the tests run during the experiments of the present invention that there appears to be a synergistic reaction between the silica material and the chrysotile asbestos when both are present in the organic liquid. As shown hereinafter in the examples, neither the silica material per se nor the chrysotile asbestos per se is as efficient as a thickener as contrasted to a silica-asbestos mixture when said mixture, the silica material per se, and the asbestos per se are utilized on an equivalent weight basis.

Generally speaking, the novel compositions of the present invention comprise a mixture of (a) an organic liquid; (b) a silica material as described in detail hereinafter; and (c) chrysotile asbestos. The novel thickening agent of the present invention, more specifically described hereinafter, comprises the above items (b) and (c) and such agent is present in an amount sufficient to increase the viscosity of the aforementioned organic liquid.

One of the two essential ingredients of the aforesaid thickening agent is the chrysotile asbestos. This asbestos has the formula $3MgO \cdot 2SiO_2 \cdot 2H_2O$; however, the unit cell of the material may be represented as

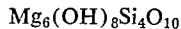

$$Mg_6(OH)_8Si_4O_{10}$$

Chrysotile asbestos, which is naturally found in an ore called serpentine, is a fibrous type material which after refining by various processes generally has a chemical analysis of the following approximate values: $SiO_2$, 37–44%; $MgO$, 39–44%; $FeO$, 0.0–6.0%; $Fe_2O_3$, 0.1–5.0%; $Al_2O_3$, 0.2–1.5%; $H_2O$, 12.0–15.0% and $CaO$, 0.0–5.0%. (The variations in the analysis set forth above are generally due to impurities remaining after the above-described refining processes; some of which are part of the crystal structure and others are extraneous minerals.) The essential composition of the chrysotile asbestos is generally known as hydrous silicates of magnesium. The refined chrysotile asbestos referred to herein is a fibrous material which has a fiber diameter of less than 1.0 microns, preferably from about 0.01 to about 0.50 micron and more preferably from about 0.02 to about 0.04 micron. The fiber length to fiber diameter is less than 2500 to 1, preferably from about 50 to 1 to about 2000 to 1, and more preferably from about 100 to 1 to about 500 to 1.

As previously mentioned, chrysotile asbestos is a mineral and is physically located in veins of serpentine when it is mined. Consequently, it undergoes a substantial purification or refining process (as described, for example, in the above cited patents) in order to remove various impurities and other foreign matter which are undesirable when such asbestos is utilized for a particular end result. It is to be understood then that the term "chrysotile asbestos" or "asbestos" when used herein refers to the material in a substantially purified or refined, fibrous form having the above-described empirical composition and having the aforesaid chemical analysis. A more detailed description of this chrysotile asbestos may be found in the Encyclopedia of Chemical Technology, edited by Kirk and Othmer, vol. 2, Second edition, pages 734 through 747 (1963), published by The Interscience Encyclopedia, Inc., New York and which publication is incorporated herein by reference.

The total amount of the silica material, hereinafter defined, and the chrysotile asbestos used should be sufficient to increase the viscosity of the aforementioned organic liquid in which they are incorporated, but preferably they should not exceed (on a combined basis) about 10% by weight of the organic liquid. Specifically, the amount of thickening agent utilized is from about 0.05% to about 6.0%, preferably from about 0.5% to about 3.0%, by weight, based on the weight of the organic liquid. The chrysotile asbestos should be present in the above-described thickening agent in an amount of at least about 10% by weight based on the total weight of said agent, the remainder, of course, being the silica material. More preferably it is desirable that the weight ratio of the silica material to chrysotile asbestos be from about 3:1 to about 1:3 and more preferably from about 2:1 to about 1:2.

The chrysotile asbestos apparently functions as a thickening synergist for the silica material when incorporated therewith into the aforementioned organic liquids. Furthermore, it has been observed that the method of incorporating the silica material and the chrysotile asbestos in the organic liquid is not critical. Specifically, the asbestos can be intimately admixed or contacted with the silica material, thus providing an intimate admixture of the two materials, prior to incorporating these two ingredients in said liquid. On the other hand, the silica material and the asbestos can be introduced separately and/or at different times into the organic liquid; for example, the silica material can be dispersed in the organic liquid followed by the dispersion of the asbestos in the organic liquid. The increase in viscosity of the organic liquid consequently is substantially the same whether the silica material and asbestos are intimately admixed prior to incorporation in the organic liquid or whether the silica material and asbestos are separately introduced into the organic liquid. However, it was observed, when conducting the experiments described herein, that incorporating the silica material per se and chrysotile asbestos per se, respectively, into separate (but equal) portions of the organic liquid did not increase the viscosity of such liquid as significantly as when the mixture of silica and asbestos, i.e. combined, were used in such, organic liquid on an equal weight base of usage, i.e. 2% silica material per se; or 2% asbestos per se; or 2% of the novel thickening agent—1% silica material and 1% asbestos. It is to be understood, then, that the term "combination of silica material and chrysotile asbestos" as used herein includes both of the aforementioned methods of incorporating the silica material and said asbestos in the organic liquid. These two ingredients, in combination, thus constitute the novel thickening agent for the organic liquid. The combination of the silica material and the chrysotile asbestos and the term "thickening agent" are intended to be synonymous and are used interchangeably herein.

In the past, a wide variety of commercially available silica products such as silica gels, fume silicas (including arc silicas), precipitated silicas, and silica hydrogels or aerogels have been suggested for use as thickening agents. However, it has unexpectedly been found, in accordance with the present invention, that only the silica aerogels and fume silicas (including arc silicas) are suitable in combination with the chrysotile asbestos to effectively thicken an organic liquid using low concentrations of the thickening agent. In brief, the other silica products such as precipitated silicas and the like, are not effective thickening agents whether used alone or with the chrysotile asbestos heretofore defined. It is to be noted that the term "silica material" as utilized herein is thus restricted to the silica aerogels, fume silicas (including arc silicas) and mixtures thereof.

One preferred class of the operative silica materials is an amorphous silica aerogel which can be combined with the chrysotile asbestos for use in the compositions of this invention. This class of aerogels consist of a finely divided, amorphous, hydrophilic silica aerogel comprising a silica polymer having siloxy groups. Such silica aerogels are usually characterized in having from about 0.1% to about 3.0% by weight of carbon. Furthermore, said aerogels usually contain from about 0.1% to about 3.5% by weight hydrogen. Preferably, these silica aerogels have an average particle size of from about 0.1 (or less) to about 5 microns, and a specific surface area of from about 50 to about 500 square meters per gram.

These silica aerogels are also generally characterized by having substantially no reactive or neutralizable halogen. The only halogen present is in the form of a halogen salt such as sodium chloride, and, as such, the halogen content is less than about 1.0% by weight and may be as low as about 0.1% (or lower) by weight. Generally, the halogen content of the preferred aerogels used herein is less than about 0.5% by weight. It will be understood, then, that when reference is made to the In addition to the utilization of silica aerogels with the chrysotile asbestos, there are the previously mentioned fume silicas which are generally referred to as such because said silicas are prepared by the reaction of silicon tetrachloride, hydrogen, and oxygen (supplied as air) in furnaces operated at high temperatures and which contain minor amounts e.g., 1%–3% by weight of reactive or neutralizable halogen. Some of the well-known fume silicas are commercially available under the trademarks "Cab-O-Sil" and "Aerosil." These materials may be prepared in the manner more specifically described in Industrial and Engineering Chemistry, volume 51; No. 3; March 1959; pages 232–238. Table 1 also illustrates some of the properties of these fume silicas.

As previously mentioned, the arc type silica is also to be considered as a fume silica for the purposes of this specification since the generic process for producing the fume silica and the arc silica is substantially the same. (The arc type silica is produced by reducing a high-purity sand in a furnace to silicon monoxide which subsequently reacts in vapor phase with air to yield the fine, high-purity product. Further details are described in Chemical Week, Sept. 25, 1965 and which publication is incorporated herein by reference.)

TABLE 1

| Typical analysis | Types of silica materials [1] | | | | |
|---|---|---|---|---|---|
| | 1 | 2 | 3 | 4 | 5 |
| Loosely packaged bulk density, lbs./cu. ft. | 6.0 | 6.0 | 5.0 | 2.5 | 2.5–7.0 |
| Volatiles at 600° C., percent | 4.0 | 4.4 | 5.0 | 5.5 | 1.3 |
| Equivalent sodium sulfate, percent | 2.5 | 0.03 | 0.03 | 2.5 | <0.1 |
| pH 4% slurry at 25° C. | 3.8 | 3.8 | 3.6 | 4.0 | 3.5–4.0 |
| Surface area, sq. meters/gm. | 150 | 260 | 260 | 280 | 175–200 |
| Oil absorption, gms. oil/gm. | 2.6 | 3.5 | 3.5 | 3.7 | |
| $SiO_2$ percent | 92.94 | 94–96 | 94–96 | 90–92 | 99.0–99.7 |
| Absolute density, lbs./gal. | | 17.1 | | | |
| Average agglomerate size, microns | 5.0 | 5.0 | 3.0 | 2.9 | |
| Ultimate particle size, microns | 0.01–0.02 | 0.01–0.02 | 0.01–0.02 | 0.01–0.02 | 0.015–0.020 |
| Silanol groups per square millimicron of silica particle surface area | 7.2 | 8.1 | 7.5 | 7.8 | 4.5–5.5 |
| $SiO_2$:C | 250:1–900:1 | 200:1–1,200:1 | 100:1–750:1 | 10:1–50:1 | [2] |
| $SiO_2$:H | 2.4:1–8.1:1 | 2:1–9:1 | 2.3:1–7.4:1 | 0.77:1–2:1 | [2] |

[1] Silica materials designated 1 through 4 are different grades of silica aerogels and are commercially available under the trademark Santocel. Type 5 is a fume silica commercially available under the trademark Cab-O-Sil M-5.
[2] Carbon and hydrogen are generally not present in significant amounts, if any.

"silica aerogel," this term connotates a silica aerogel which contains substantially no reactive or neutralizable halogen and that the only halogen that is present is in the form of a halogen salt or some other halogen compound which is essentially not reactive (or neutralizable with acid).

A particularly suitable class of organo-silica aerogels which are preferred for use in the present invention are those organo-silica aerogels which are described in the Taulli patent application, Ser. No. 199,655, filed on June 4, 1962 and now U.S. 3,346,507 and used in the Taulli Pat. U.S. 3,210,273, both of which are hereby incorporated herein by reference. The Taulli aerogels are usually characterized in having from about 0.4% to about 1.2% by weight of carbon (stated differently, the $SiO_2$ to carbon atom ratio is in the range of from about 10:1 to about 50:1). Furthermore, the Taulli aerogels usually contain from about 0.9% to about 1.5% by weight of hydrogen (stated differently, the $SiO_2$ to hydrogen atom ratio is in the range of from about 0.77:1 to about 2:1). These preferred aerogels are usually further characterized in having an average particle size of from about 1.0 to about 2.5 microns, a specific surface area of from about 100 to about 400 square meters per gram, and an external surface area of from about 1.70 to about 1.95 square meters per gram.

As previously pointed out, a wide range of silica aerogel materials may be combined with the chrysotile asbestos and subsequently incorporated in the novel compositions of the present invention. Table 1 sets forth typical analysis of some of the various aerogel materials commercially available and which can be used in the present invention.

It is to be noted with reference to Table 1 that most aerogel materials listed therein (which may be used in the present invention) are prior art silica aerogels which have not been efficient as thickeners but are quite efficient thickeners in combination with the chrysotile asbestos. Such prior art silica aerogels per se were required to be used in large quantities, i.e., usually greater than 10% by weight based upon the weight of the material to be thickened. Representative of such prior art silica aerogels are those described in U.S. Pats. 2,093,454; 2,285,449; and 2,285,477, all of these patents being incorporated herein by reference.

The $SiO_2$:C and $SiO_2$:H ratios disclosed in Table 1 were calculated by first converting the weight percent of $SiO_2$ in the silica aerogel and the weight percent of carbon and hydrogen in the silica aerogel to mol percentages. The $SiO_2$:C ratios were then calculated by dividing the mol percent of carbon into the mol percent of the $SiO_2$. The $SiO_2$:H ratios were calculated by dividing the mol percent of hydrogen into the mol percent of $SiO_2$.

The organic liquids which may be employed in the compositions of this invention are exemplified by liquids such as liquid organic resins, organic solvents, liquid organic film-formers, oleagineous liquids, mixtures thereof, and the like. Generally these organic liquids per se have a viscosity in the range of from about 2.5 millipoises to about 4,000 centipoises at a temperature of about 25° C.

As stated above, the silica material, i.e. aerogel or fume silica, and the chrysotile asbestos may be employed in compositions comprising any of the hereindescribed organic liquids to thicken, i.e. render thixotropic, and/or increase the viscosity of such liquids to a greater degree than when employing, for example, the prior art silica materials per se.

The term "thixotropic" is used herein to denote the property of certain organic liquids, containing the thickening agent (i.e. the chrysotile asbestos and organo-silica aerogels or fume silicas), to thicken and to change rapidly, on standing, from a liquid into a gel-like solid mass or body having suffcient cohesive strength to withstand distortion by gravitational force when suspended freely in an inverted receptacle or on a coated object. The gel is also of such a nature that it can be fluidized by the application of mechanical agitation as by shaking, stirring, vibrating, and the like. The property of thixotropy as understood herein is thus characterized by a reversible isothermal sol⇌gel transition.

Classes of organic liquids having a relatively low viscosity, e.g., in the range of from about 2.5 to 25 millipoises at 25° C. can be employed in combination with the chrysotile asbestos-silica material (thickening agent) to provide compositions having a viscosity appreciably above 25 millipoises and up to 500 or more centipoises at such temperature. Such organic liquids may be organic solvents, for example, solvents used in paint, varnish or lacquer removers, and include liquids such as aliphatic and aromatic alcohols, ketones, and esters, for example, ethanol, acetone, methyl ethyl ketone, ethyl acetate, amyl acetate and the like.

Also, classes of organic liquids having relatively higher viscosities, e.g., viscosities ranging from about 100 to 600 centipoises at 25° C., can be used with the chrysotile asbestos and silica material to provide compositions having viscosities of from 1,000 to 8,000 (or more) centipoises measured at 25° C. Such organic liquids include classes of oleaginous liquids such as oils of animal and vegetable origin, for example, cod liver oil, olive oil, corn oil, and the like. Also included in the oleaginous liquids are lubricating oils such as hydrocarbon motor oils and these may be employed in conjunction with the thickening agent to provide gel-like bodies having a grease consistency. Furthermore, mixtures of the aforementioned oils may be thickened by the practice of the present invention.

Other classes of organic liquids which may be thickened and/or rendered thixotropic include organic film-formers, i.e. film-forming organic liquids, such as liquids containing a dissolved organic film-forming, or bonding, solid or liquid which, on evaporation of such liquid or by polymerization during or after evaporation of such organic liquid, forms films, coatings, or a binder which is capable of bonding two similar (e.g., glass fibers) or two dissimilar materials with a relatively high strength bond.

For example, liquid coating compositions comprising solutions of high molecular weight film-formers dissolved in organic solvents may be thickened by dispersing in the solution from about 0.05% to about 2.0% by weight, based on the weight of the solution of an admixture of a silica aerogel (or fume silica) and the chrysotile asbestos. Also certain organic liquid polymers may be made thixotropic by dispersing therein from about 0.05% to about 3.0% by weight, based on the weight of the composition, of an admixture (1:1 weight ratio) of the chrysotile asbestos-silica aerogel (or fume silica). Such compositions are generally employed as adhesives, films, foils, lacquers, paints, stretching lacquers (dopes) and the like and comprise solutions or suspensions of high molecular weight organic film-formers such as, for example, nitrocellulose, cellulose acetate, chlorinated rubber, polyvinyl acetate, polyvinyl chloride, polyacrylic esters, cellulose butyrate, cellulose propionate, and the like, which are dissolved or suspended as fine particles in organic solvents or liquids such as, for example, acetone, ethanol, ethyl acetate, amyl acetate, dioctyl phthalate, etc.

The above organic film-forming compositions usually contain from about 40% to 50% by weight of film formers dissolved or suspended in an organic solvent or liquid and may often have a dispersed phase consisting essentially of pigments or fillers. Where it is desired that the above-described liquid compositions be applied to objects in the form of a spray or spreadable liquid, the addition of from about 0.05% to 3% by weight (depending upon the amount of film-forming materials in the composition) of an admixture (1:1 weight ratio) of the silica materials and the chrysotile asbestos to such compositions will cause the formation of a thixotropic gel composition almost immediately on contact with the object to which they are applied and such gel composition will then not run or drain from such objects.

Among the liquid organic resin compositions referred to above which may be employed with the silica aerogels or fume silicas in combination with the chrysotile asbestos as particularly useful composition embodiments of this invention are plastisol compositions comprising halogenated vinyl or vinylidene resins such as, for example, an emulsion polymerized polyvinyl chloride polymer suspended in a plasticizer such as a phthalate ester, for example, dioctyl phthalate, dibutyl phthalate, dihexyl phthalate, ethyl hexyl phthalate and the like, in which the plasticizer chosen is a plasticizer for the resin employed. Such plastisol compositions are described in U.S. Pat. 2,852,482, issued Sept. 16, 1958, to Paul R. Graham and U.S. Pat. 2,885,378, issued May 5, 1959, to Joseph R. Darby. Since plastisol compositions are used as films for coating molds, they must be liquid or at least have some degree of fluidity (that is, flow characteristics). However, when in the liquid state, the halogenated vinyl or vinylidene resin particles and fillers or pigments, which fillers or pigments are often incorporated in such compositions, tend to settle out and render the plastisol composition non-homogeneous and unsuitable for such films. It has presently been found that the addition of from 0.05% to 5.0%, preferably from 0.25% to 3.0%, by weight of an admixture of aforementioned silica aerogels or fume silicas combined with the chrysotile asbestos to such compositions will suitably thicken the composition to the point where such composition will overcome the aforementioned problems.

It has also been found possible to thicken and/or render thixotropic, polymerizable organic liquid compositions comprising polymerizable resins including solventless varnishes and polyester resin compositions which are used in coating, filling, adhesive, and laminating operations by incorporating small amounts of the chrysotile asbestos and fume silica or silica aerogel therein. Such compositions include liquid alkyd resins or solutions of solid alkyd or polyester resins dispersed in a solvent (for example, styrene) which is usually copolymerizable with the polyester resin.

Other organic resin liquids which may be employed in combination with the (chrysotile asbestos-silica material) thickening agent in a preferred embodiment of this invention are polymerizable liquids comprising unsaturated alkyd resins. These resins are the reaction products of (i) polyhydric alcohols, mixtures of polyhydric alcohols or mixtures of polyhydric and monohydric alcohols, and (ii) an alpha unsaturated alpha, beta carboxylic acid, or a plurality of polycarboxylic acids one of which at least is an unsaturated polycarboxylic acid. Examples of such polyhydric alcohols are ethylene glycol, di- and triethylene glycol, propylene glycol, tetramethylene glycol, glycerine or pentaerithrytol in combination with a monohydric alcohol, etc. Examples of unsaturated polycarboxylic acids are maleic, fumaric and itaconic acids. The term polycarboxylic acid as used herein is intended to include within its meaning the anhydrides of such acids which may also be employed. In addition to one or more of the unsaturated polycarboxylic acids, saturated polycarboxylic acids may also be present in the reaction mixture referred to above. Examples of such saturated polycarboxylic acids are succinic, adipic, sebacic, phthalic and terphthalic acids.

The anhydrides of such acids may also be used instead of the acids or in combination therewith.

It has also been discovered that incorporating the thickening agent of this invention in a polyhydric alcohol per se (which falls within the general class of organic solvents), i.e., without any polymerization or reaction with other materials, consequently results in an alcohol having a greatly increased viscosity and being more thixotropic.

Instead of the above unsaturated alkyl resins, the polymerizable liquids which may be used in the compositions of the present invention may contain polymerizable substances such as, for example, esters of monhydric alcohols and polycarboxylic acids, including unsaturated polycarboxylic acids, halogenated aromatic polycarboxylic acids and polybasic inorganic acids. Examples of such substances are dialkyl maleate, dialkyl fumarate, dialkyl itaconate, and the like. Other substances which may be incorporated in these polymerizable liquids are esters of monohydric alcohols and unsaturated polycarboxylic acids which are capable of copolymerizing with unsaturated alkyd resins such as, for example, dioctyl itaconate, dibenzyl itaconate, diethyl fumarate, dibenzyl fumarate, and the like.

The above-described unsaturated resins may be liquids, or solids dissolved in organic liquids, and the thickening agent may be directly dispersed in the liquids. When the unsaturated resin is a solid, it is necessary to dissolve the resin in an organic solvent, preferably a solvent which is copolymerizable with the polyester resin, such as, for example, styrene or other liquid copolymerizable monomers.

There may also be incorporated in the above-described polymerizable liquid compositions containing the thickening agent of this invention, small amounts ranging from about 0.5% to 2.0% by weight, based on the weight of the polymerizable liquid, of a polymerization catalyst. Many types of polymerization catalysts, well known to those skilled in the art, may be incorporated in the polymerizable liquid compositions of this invention including for example, benzoyl peroxide, methyl ethyl ketone peroxide, cyclo-hexane peroxide, and cumene hydroperoxide, which provide the oxygen necessary to effect polymerization.

Additional organic resin liquids which may be thickened and/or rendered thixothropic include the well known epoxy resins; that is, resins based on ethylene oxide or its homologues or derivatives. The epoxy resins may be condensation polymers of epichlorohydrin and (a) bisphenol A [2,2-bis'(p-hydroxyphenyl)-propane,

HOC₆H₄C(CH₃)₂C₆H₄OH]

(b) ethylene glycol, (c) glycerol, and/or (d) related hydroxyl-containing compounds, and have both epoxide

and hydroxyl groups, which are capable of further reaction with various modifiers or curing agents. These resins are usually pale amber in color and range from viscous liquids to brittle solids with softening points varying from 40° C. to 150° C. Several epoxy resins which are suitable for use in conjunction with the novel thickening agents of the present invention are commercially available under the trademarks Araldite, Bakelite, Epi-Rez, C-8, Devron, and Epon. Those epoxy resins which are liquid may be thickened as in the case of the other organic liquids described above. However, if the resins are in solid form, then such resin may be dissolved and/or dispersed in a solvent and the resultant liquid resin-solvent mixture may be thickened by the practice of the present invention. Furthermore, these liquid resin combinations may be utilized with suitable curing agents which are well known in the plastic art; for example, curing agents which may be mentioned include organic bases such as amines, acid anhydrides, and compounds containing active hydrogen.

A particularly useful embodiment of the present invention comprises organic thixotropic compositions comprising natural and/or synthetic polymers (i.e. organic resins) dissolved in a liquid and thickened with the silica materials in combination with the chrysotile asbestos.

One preferred embodiment of the present invention is a thickening agent, useful for increasing the viscosity and thixotropy of an organic liquid, consisting essentially of an intimate mixture of (a) particles of a finely divided, amorphous, organo-silica aerogel comprising a silica polymer having siloxy groups, said organo-silica aerogel being characterized in having an average particle size of between about 1.0 and 2.5 microns, a specific surface area of from about 100 to about 400 square meters per gram, and an external surface area of from about 1.70 to 1.95 square meters per gram, said aerogel being further characterized in containing from about 0.4% to about 1.2% by weight carbon and from about 0.9% to about 1.5% by weight hydrogen and having a loose bulk density of less than 15 pounds per cubic foot; and (b) chrysotile asbestos; the weight ratio of said aerogel to asbestos being from about 3:1 to about 1:3.

Another preferred embodiment of the present invention is a composition of matter comprising a liquid organic styrenepolyester resin, and a thickening agent consisting essentially of (a) a finely divided, amorphous, hydrophilic, oragno-silica aerogel comprising a silica polymer having siloxy groups, said organo-silica aerogel being characterized in having an average particle size of between about 1.0 and 2.5 microns, a specific surface area of from about 100 to 400 square meters per gram, and an external surface area of from about 1.70 to 1.95 square meters per gram, said aerogel being further characterized in containing from about 1% to about 10% by weight water, from about 0.1% to about 1.0% by weight or unreactive halogen in the form of a halogen salt, from about 0.4% to about 1.2% by weight of carbon and from about 0.9% to about 1.5% by weight of hydrogen and (b) chrysotile asbestos which is characterized by having a fiber diameter of from about 0.01 to about 0.50 microns and a ratio of the fiber length to such fiber diameter from about 100:1 to about 500:1; the weight ratio of such aerogel to such asbestos being from 2:1 to about 1:2; and said thickening agent being used in an amount of from about 0.05% to about 6.0% based on the weight of said organic resin.

A further understanding of the processes and compositions of the present invention will be obtained from the following examples which are intended to illustrate the invention but not to limit the scope thereof, parts and percentages being by weight unless otherwise specified.

EXAMPLE I

In order to more effectively illustarte the unique thickening properties of the present invention thickening agent, i.e., the admixture of the chrysotile asbestos and a silica aerogel of fume silica, when incorporated in various organic liquids and the resultant increase in viscosity and/or thixotropy, the following experimental information is presented. Approximately six 100-gram samples of each of the silica materials listed in Table 2, infra, were intimately admixed (by manual shaking in a closed container for approximately one minute) with various amounts of a chrysotile asbestos in order to provide a thickening agent having the silica to asbestos weight ratio set forth in Table 2. The chrysotile asbestos utilized was a "High Purity Opened Asbestos" commercially available from the Union Carbide Corporation and which has characteristics and properties as described in TAPPI, vol. 48, No. 8, August 1965, which publication is incorporated herein by reference.

The organic liquid to be thickened with the aforementioned thickening agent contained 40 parts of styrene in which was dissolved 60 parts of an unsaturated polyester resin. This resin was prepared by reacting 50 mol percent of phthalic anhydride and 50 mol percent of maleic anhydride with a 25% molar excess of propylene glycol, which excess of propylene glycol was thereafter distilled off leaving a solid, hard, brittle, unsaturated polyester resin.

To approximately 245-gram separate portions of the above liquid styrene-polyester resin compositions, there were separately added (a) 5 grams of each of the chrysotile asbestos-silica admixture having various weight ratios of silica to asbestos; (b) 5.0 grams of fume silica per se; (c) 5.0 grams of the asbestos per se; and (d) 5 grams of the aerogel per se; these compositions are summarized in Table II. Thus, it will be noted that not all of the compositions contained both the asbestos and silica material. This particular point is made in order to show the sharp contrast between (1) organic liquids thickened with the thickening agent of the present invention which constitutes the silica aerogel or fume silica in combination with the aforementioned chrysotile asbestos and (2) organic liquids thickened with the chrysotile asbestos per se, silica aerogel per se or fume silica per se, the latter two (i.e., the silica materials) of which have been suggested as thickening agents by the prior art. The asbestos-silica admixtures, aerogels per se, and fume silicas per se were then mechanically dispersed into the separate liquid resin compositions by means of mixing the materials together for a 4-minute period in an Eppenbach dispersion mixer. After 24 hours of aging, the viscosities of each of the compositions were then measured at 25° C. by a model RVT Brookfield Viscosimeter using a TA Spindle at 20 r.p.m., 10 r.p.m., and 5 r.p.m. The values obtained from these measurements are shown in Table 2.

It can readily be seen then from the data set forth in Table 2 that the utilization of the thickening agent of the present invention results in a substantial increase in viscosity and in thixotropy when incorporated in an organic liquid as contrasted to the utilization of (a) the silica materials per se in such organic liquids as in prior art compositions and (b) the asbestos per se in organic liquids.

In conjunction with the use of the asbestos per se in the liquid styrene-polyester resin, it was observed that agglomeration of the asbestos took place within five minutes after mixing with said resin which resulted in a coarse, uneven mixture. Consequently, while the use of asbestos per se in a resin results in an increase in viscosity of said resin, the above-described agglomeration problem is present. However, in all cases where there was a mixture of both the asbestos and the silica aerogel or fume silica used in the resin, the aforesaid agglomeration problem did not appear. It is readily apparent then that in addition to significantly reducing the amount of silica material (which presently costs more than said asbestos) required to thicken a particular liquid, it appears that the asbestos (when used with said silica material) also undergoes a change in physical and/or chemical character. Consequently, the tendency to agglomerate (i.e. when the asbestos per se is used in an organic liquid) disappears when used in admixture with the silica material, the resultant liquid system remains evenly smooth, and the thickening effect is unexpectedly greater as contrasted to the use of the asbestos per se or the silica material per se.

In addition to the above advantages of the present invention thickening agents, it was also shown (see Table 3) that a liquid system, which had incorporated therein the present invention thickening agent, remains substantially stable on aging as contrasted to the use of the silica material per se or the asbestos per se. In other words, when a liquid system has incorporated therein either the silica material per se or the asbestos per se, the viscosity of the system decreases, i.e., there is a reduction in thickening, on aging.

In conjunction with Table 3, the preparation of the various compositions was the same as that procedure set forth above regarding Table 2. However, the amount of thickening agent used was 1.5%.

The results set forth in Table 3 were obtained on a different batch of polyester resin. Since there is some variance in properties on a particular polyester resin from batch to batch, the results, i.e., viscosity values (Table 3) from this batch of polyester resin are not the same as those given in Table 2. Nevertheless, the order of magnitude differences for this batch of polyester resin will be somewhat comparable to those shown in Table 2. Another factor which also has an effect on viscosity values of the polyester resin (and also other liquids) is the method of dispersing the silica aerogel in said resin. Specifically, it has been observed that the utilization of a high shear dispersion technique, for example—the above-described Eppenbach dispersion mixer, will generally result in lower viscosity values as contrasted to using a low shear dispersion technique, for example—manually dispersing the material in the liquid, which results in substantially higher viscosity values.

TABLE 2

| Composition | Thickening agent | | | Viscosity in centipoises at 25° C. Brookfield RVT Helipath TA spindle | | | Thixotropy Index [2] |
| | Type silica | Wt. ratio silica: asbestos | Wt. percent used [1] | 20 r.p.m. | 10 r.p.m. | 5 r.p.m. | |
| --- | --- | --- | --- | --- | --- | --- | --- |
| Liquid styrene polyester resin | None | | 0 | 800 | | 850 | |
| Do | Aerogel [5] | [3] 1:0 | 2 | 3,100 | 3,400 | 3,720 | 1.20 |
| Do | None | [4] 0:1 | 2 | 2,360 | 2,640 | 2,960 | 1.25 |
| Do | Aerogel [5] | 3:1 | 2 | 3,750 | 4,900 | 6,650 | 1.77 |
| Do | do.[5] | 2:1 | 2 | 3,770 | 4,980 | 6,680 | 1.78 |
| Do | do.[5] | 1:1 | 2 | 3,860 | 5,050 | [8] 6,790 | 1.76 |
| Do | do.[5] | 1:2 | 2 | 3,850 | 5,090 | 6,770 | 1.76 |
| Do | do.[5] | 1:3 | 2 | 3,780 | 4,990 | 6,670 | 1.77 |
| Do | Fume [6] | [7] 1:0 | 2 | 2,550 | 3,160 | 3,800 | 1.49 |
| Do | do.[6] | 3:1 | 2 | 3,680 | 4,000 | 6,280 | 1.71 |
| Do | do.[6] | 2:1 | 2 | 3,690 | 4,100 | 6,350 | 1.72 |
| Do | do.[6] | 1:1 | 2 | 3,700 | 4,150 | 6,370 | 1.72 |
| Do | do.[6] | 1:2 | 2 | 3,700 | 4,100 | 6,320 | 1.71 |
| Do | do.[6] | 1:3 | 2 | 3,650 | 4,070 | 6,300 | 1.73 |

[1] Based on the weight of the composition, e.g. 2 parts thickening agent/98 parts composition.
[2] Thixotropy index = viscosity at 5 r.p.m. / viscosity at 20 r.p.m.
[3] Only the aerogel per se was used as a thickening agent for control purposes.
[4] Only the asbestos per se was used as a thickening agent for control purposes.
[5] Silica Type 4 of Table 1.
[6] Silica Type 5 of Table 1.
[7] Only the fume silica per se was used as a thickening agent for control purposes.
[8] Higher numerical value for viscosity and thixotropy indicates greater effectiveness.

TABLE 3

| Composition | 25° C., aging days | Thickening agent | | Wt. percent used [1] | Viscosity in centipoises at 25° C. Brookfield RVT Helipath TA spindle | | | Thixotropy index [2] |
| --- | --- | --- | --- | --- | --- | --- | --- | --- |
| | | Type silica | Wt. ratio, silica: asbestos | | 20 r.p.m. | 10 r.p.m. | 5 r.p.m. | |
| Liquid styrene-polyester resin | 1 | None | | 0 | 500 | | 550 | |
| Do | 17 | do | | 0 | 500 | | 550 | |
| Do | 1 | Aerogel [3] | [4] 1:0 | 1.5 | 1,750 | 1,900 | 2,000 | 1.14 |
| Do | 17 | do [3] | [4] 1:0 | 1.5 | 1,640 | 1,700 | 1,800 | 1.10 |
| Do | 1 | None | [5] 0:1 | 1.5 | 2,200 | 2,340 | 2,640 | 1.20 |
| Do | 17 | do | [5] 0:1 | 1.5 | 2,050 | 2,060 | 2,120 | 1.03 |
| Do | 1 | Aerogel [3] | 1:1 | 1.5 | 2,750 | 3,520 | 4,600 | 1.68 |
| Do | 17 | do [3] | 1:1 | 1.5 | 2,820 | 3,560 | [6] 4,720 | [6] 1.68 |
| Do | 1 | Fume [7] | 1:1 | 1.5 | 2,700 | 3,500 | 4,510 | 1.67 |
| Do | 17 | do [7] | 1:1 | 1.5 | 2,790 | 3,560 | 4,680 | 1.68 |
| Do | 1 | do [7] | [8] 1:0 | 1.5 | 1,830 | 1,990 | 2,100 | 1.15 |
| Do | 17 | do [7] | [8] 1:0 | 1.5 | 1,610 | 1,760 | 1,810 | 1.13 |

[1] Based on the weight of the composition, e.g. 1.5 parts thickening agent/98.5 parts composition.
[2] Thixotropy index = $\frac{\text{viscosity at 5 r.p.m.}}{\text{viscosity at 20 r.p.m.}}$
[3] Silica Type 4 of Table 1.
[4] Only the aerogel per se was used as a thickening agent for control purposes.
[5] Only the asbestos per se was used as a thickening agent for control purposes.
[6] Higher numerical value for viscosity and thixotropy indicates greater effectiveness.
[7] Silica Type 5 of Table 1.
[8] Only the fume silica per se was used as a thickening agent for control purposes.

EXAMPLE II

Table 4 illustrates the results obtained by the utilization of organo-silica aerogels and fume silicas combined with the chrysoltile asbestos (same as the asbestos used in Example I) in three different types of organic liquids, i.e. mineral oil, glycerol, and N-butyl alcohol. Also shown in Table 4 are the results of the utilization of the crysotile asbestos per se, aerogel per se and fume silica per se in the aforementioned organic liquids in order to more effectively point out the contrast between the prior art compositions (which only appear to suggest the use of such aerogel or fume silica as thickeners), and the novel compositions of the present invention. The thickening agent, i.e. the Type 4 (Table 1) silica aerogel or Type 5 (Table 1) fume silica and the chrysotile asbestos, was part of the same material which was prepared as described in the first three paragraphs of Example I. The thickening agent, the chrysotile asbestos per se, the aerogel per se, and the fume silica per se were dispersed in the aforementioned liquids (i.e. in separate but equal portions of the liquids) by an Abbe Ball Mill for 10 minutes. The viscosity of the above compositions at 25° C. was then measured by utilizing a Brookfield model LVT and a TA Spindle rotated at 6 r.p.m.

It can readily be seen from the values obtained from the Viscosimeter readings that the novel compositions containing the thickening agent, i.e. the chrysotile asbestos and either the organo-silica aerogel or the fume silica, are superior, i.e. have higher viscosity readings, than the compositions containing only the chrysotile asbestos per se, the fume silica per se, or the silica aerogel per se, which aerogel per se represents the prior art compositions as exemplified by the Taulli patent, U.S. 3,210,273.

The agglomeration problem heretofore discussed and observed (when utilizing the asbestos per se as a sole thickening agent) in Example I, was also present in the compositions of this Example II when asbestos per se was used. However, smooth even mixtures were observed when the asbestos-silica admixture was used.

The compositions of this Example II were allowed to age for approximately 20 days and then Viscosimeter readings were taken. The compositions which contained the present invention thickening agent were stable, i.e. there was no decrease in viscosity values whereas the compositions which contained the asbestos per se, fume silica per se or aerogel per se were unstable, i.e. there was a significant decrease in viscosity values.

TABLE 4

| Composition | Thickening agent | | Wt. percent used [1] | Viscosity in centipoises at 25° C. Brookfield LVT Helipath TA spindle, 6 r.p.m. |
| --- | --- | --- | --- | --- |
| | Type silica | Wt. ratio, silica: asbestos | | |
| Mineral Oil | None | | 0 | |
| Do | Fume [5] | [2] 1:0 | 1 | 250 |
| Do | None | [3] 0:1 | 1 | 300 |
| Do | Fume [5] | 1:1 | 1 | 730 |
| Do | Aerogel [6] | [4] 1:0 | 1 | 235 |
| Do | do [6] | 1:1 | 1 | 710 |
| Do | Fume [5] | [2] 1:0 | 3 | 1,500 |
| Do | None | [3] 0:1 | 3 | 1,850 |
| Do | Fume [5] | 1:1 | 3 | [7] 4,620 |
| Do | Aerogel [6] | [4] 1:0 | 3 | 1,410 |
| Do | do [6] | 1:1 | 3 | 4,550 |
| Glycerol | None | | 0 | 9 |
| Do | Fume [5] | [2] 1:0 | 1 | 660 |
| Do | Aerogel [6] | [4] 1:0 | 1 | 640 |
| Do | None | [3] 0:1 | 1 | 1,020 |
| Do | Fume [5] | 1:1 | 1 | 2,470 |
| Do | Aerogel [6] | 1:1 | 1 | 2,410 |
| N-butyl alcohol | None | | 0 | |
| Do | Fume [5] | [2] 1:0 | 5 | 90 |
| Do | Aerogel [6] | [4] 1:0 | 5 | 25 |
| Do | None | [3] 0:1 | 5 | 240 |
| Do | Fume [5] | 1:1 | 5 | 2,250 |
| Do | Aerogel [6] | 1:1 | 5 | 2,170 |

[1] Based on the weight of the composition, e.g. 1 part thickening agent/99 parts composition.
[2] Only the fume silica per se was used as a thickening agent for control purposes.
[3] Only the asbestos per se was used as a thickening agent for control purposes.
[4] Only the aerogel per se was used as a thickening agent for control purposes.
[5] Silica Type 5 of Table 1.
[6] Silica Type 4 of Table 1.
[7] Higher numerical value for viscosity indicates greater effectiveness.

EXAMPLE III

Table 5 illustrates the results of the utilization of (1) the present invention thickening agent, i.e., the Type 4 (Table 1) silica areogel or Type 5 (Table 1) fume silica and the chrysotile asbestos described in Example I, (2) organo-silica areogels per se (3) fume silicas per se, and (4) the asbestos per se, in a liquid epoxy resin which was prepared by the condensation of epichlorohydrin with biphenol A and which is commercially available under the trademark Epon 815. The thickening agent was part of the same material which was as described in the first three paragraphs of Example I. The thicekning agent, the aerogel per se, the fume silica per se and the asbestos per se were all dispersed in separate but equal portions of the liquid epoxy resin composition by the same technique as set forth in Example I. The viscosity measurements were conducted at 25° C. on a model RVT Brookfield Viscosimeter using a TA Spindle rotated at 20 r.p.m. and at 5 r.p.m. In this example, the liquid epoxy resin compositions were aged for 24 hours at 25° C. after which time the viscosity of each composition was determined. It can readily be seen from the values set forth in Table 5 that the liquid epoxy resins containing the present invention thickening agent; i.e., the chrysotile asbestos and the organic-silica aerogel or fume silica, were superior, i.e., have higher viscosity readings, than the compositions which contained only the silica aerogel per se, the fume silica per se, or the asbestos per se.

the chrysotile asbestos and a silica aerogel or a fume silica, to provide thickened liquids which have substantially more thixotropy and a significantly higher viscosity than the same organc liquids thickened only with the silica materials per se or the asbestos per se, when compared on an equal weight basis.

What is claimed is:

1. A thickening agent comprising synergistic proportions of an admixture of (a) a silica material selected from the group consisting of silica aerogel, fume silica and mixtures thereof, and (b) chrysotile asbestos.

TABLE 5

| Composition | Thickening agent | | | Viscosity in centipoises at 25° C. Brookfield RVT Helipath TA spindle | | Thixotropy Index [2] |
| --- | --- | --- | --- | --- | --- | --- |
| | Type silica | Wt. ratio, silica: asbestos | Wt. percent used [1] | 20 r.p.m. | 5 r.p.m. | |
| Epoxy resin [3] | None | | 0 | 610 | 610 | 1.00 |
| Do.[3] | Fume [4] | [6] 1:0 | 2 | 1,080 | 1,125 | 1.04 |
| Do.[3] | Aerogel [5] | [7] 1:0 | 2 | 2,150 | 3,010 | 1.40 |
| Do.[3] | None | [8] 0:1 | 2 | 2,370 | 3,260 | 1.38 |
| Do.[3] | Fume [4] | 1:1 | 2 | 4,250 | 8,100 | 1.91 |
| Do.[3] | Aerogel [5] | 1:1 | 2 | 4,640 | [9] 9,010 | [9] 1.95 |

[1] Based on the weight of the composition, e.g. 2 parts thickening agent/98 parts composition.
[2] Thixotropy index = viscosity at 5 r.p.m. / viscosity at 20 r.p.m.
[3] Commercially available under the trademark Epon-815 (the composition also contained 2 parts resorcinol/100 parts resin).
[4] Silica Type 5 of Table 1.
[5] Silica Type 4 of Table 1.
[6] Only the fume silica per se was used as a thickening agent for control purposes.
[7] Only the aerogel per se was used as a thickening agent for control purposes.
[8] Only the asbestos per se was used as a thickening agent for control purposes.
[9] Higher numerical value for viscosity and thixotropy indicates greater effectiveness.

EXAMPLE IV

Example I heretofore set forth above was again repeated with the exception that an oleaginous liquid, a S.A.E. 30 weight automotive lubricating oil, was used instead of the liquid polyester resin-styrene composition. The values obtained from the viscosity measurements conducted on the oleaginous liquid thickened with the present invention thickening agent were similar to the values set forth on Table IV (the data therein pertaining to a mineral oil thickened with 3% by weight of the chrysotile asbestos-silica aerogel admixture and 3% by weight of the chrysotile asbestos-fume silica admixture.)

EXAMPLE V

In conjunction with the above-described Examples I through IV, additional organic liquid compositions containing the novel thickening agents of the present invention were prepared and tested for viscosity values. In this Example V, however, the thickening agent consisted of 50% by weight chrysotile asbestos, 25% by weight fume silica and 25% by weight silica aerogel. The viscosity values of these additional organic compositions were substantially the same as when the fume silica-asbestos mixture per se, or silica aerogel-asbestos mixture per se were utilized in Examples I–IV.

EXAMPLE VI

This example was carried out in order to compare the present invention thickening agent, i.e. an admixture of asbestos and fume silica or silica aerogel, with the suggested thickening agent (i.e. a polystyrene fiber-finely divided silica) of U.S. Pat. No. 3,354,114. More specifically, Examples III, IV and V of U.S. 3,354,114 were repeated into with the exception that also included in the testing was the crysotile-silica aerogel-type 4-Table 1 (weight ratio 1:1) admixture of the present invention. The results from the repeats of these examples (U.S. 3,354,114) showed in each case that the present invention thickening agent was approximately 15–25% greater in thickening efficiency than the polystyrene-silica agent of U.S. 3,354,114.

In view of the aforementioned examples and the data set forth in Tables 2–5, it can readily be seen that a large variety of organic liquids can be thickened with the present invention thickening agent, i.e., the combination of the chrysotile asbestos and a silica aerogel or a fume silica, to provide thickened liquids which have substantially more thixotropy and a significantly higher viscosity than the same organc liquids thickened only with the silica materials per se or the asbestos per se, when compared on an equal weight basis.

2. The thickening agent as set forth in claim 1 wherein the weight ratio of said silica material to the chrysotile asbestos is from about 3:1 to about 1:3.

3. The thickening agent as set forth in claim 2 wherein the silica material is a silica aerogel which is characterized by having from about 0.1% to about 3.0% by weight carbon, from about 0.1% to about 3.5% by weight hydrogen, an average particle size of from about 0.1 to about 5 microns, a specific surface area of from about 50 to about 1000 square meters per gram, and a loose bulk density of less than 15 pounds per cubic foot.

4. The thickening agent as set forth in claim 3 wherein the silica aerogel is an organo-silica aerogel which is characterized by having from about 0.5% to about 1.2% by weight carbon, from about 0.9% to about 1.0% by weight hydrogen, an average particle size of from about 1 to about 2.5 microns, a specific surface area of from about 100 to about 400 square meters per gram, and an external surface area of from about 1.70 to about 1.95 square meters per gram.

5. A thickening agent comprising an intimate mixture of (a) an organo-silica aerogel which is characterized by having from about 0.4% to about 1.2% by weight carbon, from about 0.9% to about 1.5% by weight hydrogen, an average particle size of from about 1 to about 2.5 microns, a specific surface area of from about 100 to about 400 square meters per gram, and an external surface area of from about 1.70 to about 1.95 square meters per gram, and (b) chrysotile asbestos which is characterized by having a fiber diameter of from about 0.01 to about 0.50 micron and the ratio of the fiber length to the aforesaid diameter is from about 100:1 to about 500:1; the weight ratio of the organo-silica aerogel to chrysotile asbestos being from about 3:1 to about 1:3.

6. A composition of matter comprising a mixture of (1) an organic liquid; and (2) a thickening agent comprising synergistic proportions of (a) a silica material selected from the group consisting of silica aerogel, fume silica and mixtures thereof; and (b) chrysotile asbestos; the amount of said thickening agent being sufficient to increase the viscosity of said organic liquid.

7. The compostion as set forth in claim 6 wherein the weight ratio of the silica material to chrysotile asbestos is from about 3:1 to about 1:3.

8. The composition as set forth in claim 7 wherein the silica material is a silica aerogel which is characterized by having from about 0.1 to 3.0% by weight carbon, from about 0.1% to about 3.5% by weight hydrogen, an average particle size of from about 0.1 to about 5 microns, a specific surface area of from about 50 to about 1000 square meters per gram, and a loose bulk density of less than 15 pounds per cubic foot.

9. The composition set forth in claim 8 wherein (1) the silica aerogel is a finely divided, amorphous, hydrophilic, organo-silica aerogel having an average particle size of between about 1.0 and 2.5 microns, a specific surface area of from about 100 to 400 square meters per gram, and an external surface area of from about 1.70 to 1.95 square meters per gram; said aerogel being further characterized in containing from about 0.4% to about 1.2% by weight of carbon, and from about 0.9% to about 1.5% by weight of hydrogen; said thickening agent being used in an amount of from about 0.05% to about 6.0% based on the weight of the organic liquid.

10. The composition set forth in claim 9 wherein the organic liquid is an organic solvent having dissolved therein an organic film forming material of high molecular weight.

11. The composition set forth in claim 9 wherein the organic liquid is a liquid plastisol comprising a polymer selected from the group consisting of halogenated vinyl and vinylidene polymers suspended in a liquid plasticizer for said polymer.

12. The composition set forth in claim 9 wherein the organic liquid is an organic solvent having dissolved therein an unsaturated solid alkyl resin of a polyhydroxy alcohol and an unsaturated polycarboxylic acid, said solvent being polymerizable with said resin.

13. The composition set forth in claim 9 wherein the organic liquid is a polymerizable liquid comprising a liquid unsaturated alkyd resin obtained by the esterification of a mixture of ingredients comprising (1) a polyhydric alcohol and (2) an acid selected from the group consisting of saturated and unsaturated polycarboxylic acids.

14. The composition of claim 9 wherein the organic liquid is an oleaginous liquid selected from the group consisting of lubricating oils, animal oil, vegetable oil, and mixtures thereof.

15. The composition of claim 9 wherein the organic liquid is a liquid organic resin consisting of a liquid epoxy resin which is the condensation polymer of epichlorohydrin and bisphenol A.

16. A composition of matter comprising a liquid, organic styrene-polyester resin and a thickening agent consisting essentially of (a) solid particles of a finely divided, amorphous, hydrophilic organo-silica aerogel having an average particle size of between about 1.0 and 2.5 microns, a specific surface area of from about 100 to 400 square meters per gram, and an external surface area of from about 1.70 to 1.95 square meters per gram, said aerogel being further characterized in containing from about 1% to about 10% by weight water, from about 0.1% to about 1.0% by weight of unreactive halogen in the form of a halogen salt, from about 0.4% to about 1.2% by weight of carbon, and from about 0.9% to about 1.5% by weight of hydrogen and (b) chrysotile asbestos which is characterized by having a fiber diameter of from about 0.01 to 0.50 microns and the ratio of the fiber length to such fiber diameter is from about 100:1 to about 500:1; the weight ratio of the organo-silica aerogel to chrysotile asbestos being from about 2:1 to about 1:2 and the thickening agent being used in an amount of from about 0.05% to about 6.0% based on the weight of said organic resin.

References Cited
UNITED STATES PATENTS

| | | | |
|---|---|---|---|
| 3,210,273 | 10/1965 | Taulli | 252—28 |
| 3,374,169 | 3/1968 | Kasten et al. | 252—28 |
| 3,433,743 | 3/1969 | Morway et al. | 252—13 |

DANIEL E. WYMAN, Primary Examiner

I. VAUGHN, Assistant Examiner

U.S. Cl. X.R.

44—7; 252—28, 56; 260—37, 40, 41

Disclaimer 3,525,689.—*Ralph Marotta*, St. Louis, Mo. ORGANIC LIQUIDS THICKENED WITH SILICA-SILICATE MATERIALS. Patent dated Aug. 25, 1970. Disclaimer filed Apr. 3, 1972, by the assignee, *Monsanto Company*.

Hereby enters this disclaimer to claims 1 and 6 of said patent.

[*Official Gazette November 14, 1972.*]